United States Patent [19]
Neeff et al.

[11] 3,792,971

[45] Feb. 19, 1974

[54] EXHAUST PROCESS FOR THE DYEING OF SYNTHETIC FIBRE MATERIALS

[75] Inventors: Rütger Neeff, Leverkusen; Dietmar Kalz, Cologne, both of Germany

[73] Assignee: Farbenfabriken Bayer Aktiengesellschaft, Leverkusen, Germany

[22] Filed: Oct. 16, 1970

[21] Appl. No.: 81,548

[30] Foreign Application Priority Data
Oct. 18, 1969 Germany............................ 1952535

[52] U.S. Cl............................ 8/39, 8/41 R, 8/41 C, 8/174
[51] Int. Cl........................ D06p 1/20, D06p 3/54
[58] Field of Search............ 8/25, 39, 41, 173, 174

[56] References Cited
UNITED STATES PATENTS

| | | | |
|---|---|---|---|
| 2,863,714 | 12/1958 | Long et al................................ | 8/173 |
| 3,331,829 | 7/1967 | Jirou et al............................ | 8/174 X |
| 3,510,243 | 5/1970 | Seuret et al.............................. | 8/39 |
| 3,531,458 | 9/1970 | Ackermann et al..................... | 8/174 |
| 3,622,558 | 11/1971 | Kolliker................................ | 8/50 X |

FOREIGN PATENTS OR APPLICATIONS

| | | | |
|---|---|---|---|
| 1,048,878 | 11/1966 | Great Britain.......................... | 8/174 |

*Primary Examiner*—Leon D. Rosdol
*Assistant Examiner*—T. J. Herbert, Jr.

[57] ABSTRACT

Exhaust process for the dyeing of synthetic fibre materials from organic water immiscible solvents with disperse dyestuffs containing carboxamide groups.

26 Claims, No Drawings

EXHAUST PROCESS FOR THE DYEING OF SYNTHETIC FIBRE MATERIALS

The invention relates to an exhaust process for the dyeing of synthetic fibre materials from organic water-immiscible solvents; more particularly it concerns an exhaust dyeing process wherein as dyestuffs disperse dyestuffs containing carboxamide groups are used.

Organic water-immiscible solvents suitable for the process according to the invention are those the boiling point of which lies between 40° and 170° C, e.g. aromatic hydrocarbons such as toluene, xylene; and halogenated hydrocarbons, especially aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 2-chloropropane, 1,2-dichloropropane, 1-chlorobutane, 2-chlorobutane, 1,4-dichlorobutane, 1-chloro-2-methylpropane or 2-chloro-2-methylpropane, as well as aliphatic fluorinated and fluorochlorinated hydrocarbons, such as perfluoro-n-hexane, 1,2,2-trifluoro-trichloroethane and trifluoro-pentachloropropane; aromatic chlorinated and fluorinated hydrocarbons, such as chlorobenzene, fluorobenzene, chlorotoluene and benzotrifluoride.

Tetrachloroethylene, trichloroethylene, 1,1,1-trichloroethane and 1,1,1-trichloropropane have proved particularly satisfactory. Mixtures of these solvents may also be used.

The carboxamide group-containing disperse dyestuffs to be used according to the invention may be based on any type of dyestuff provided they contain at least one carboxamide group. The dyestuffs to be used according to the present process may belong, for example, to the series of metal-containing or metal-free mono- or polyazo dyestuffs or (azo) methine dyestuffs; to the series of anthraquinone dyestuffs and condensation products of the latter which contain more than three anellated rings; other suitable dyestuffs are oxazine, nitro-diphenylamine, naphthalic acid di- and tri-phenylmethane dyestuffs, naphtholactam condensation dyestuffs, quinophthalone dyestuffs, and dyestuffs derived from naphthoquinone and naphthoquinonimine, as well as other condensation dyestuffs. In addition to the carboxamide groups required by definition, the dyestuffs may contain other conventional substituents, such as halogen, alkyl, cycloalkyl, aralkyl, aryl, alkoxy, aryloxy, nitro, sulphone groups, optionally substituted sulphonamide groups; optionally substituted or acylated amino groups; alkylthio and arylthio, hydroxy, hydroxy-alkyloxy, amino-alkyloxy, cyano, cyanoalkyl radicals as well as alkyl, aryl, aralkyl radicals substituted in a different way, and the like.

The dyestuffs contain one or more carboxamide groups which are linked to aromatic nuclei of the basic ring system of the dyestuff itself or to aryl, aralkyl or aliphatic groupings standing in an external position. The number of carboxamide groups preferably amounts to 1 to 4.

The carboxamide groups are characterised by the formula

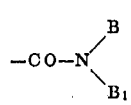

in which the radicals B and $B_1$, independently of one another, denote hydrogen or optionally substituted lower alkyl or alkenyl groups, aryl radicals or heteroaryl radicals. The radicals B and $B_1$ together may also form a ring which may be interrupted by hetero atoms.

Examples of radicals B and $B_1$ are the methyl, ethyl or trifluoro-methyl radicals; the $\beta$-hydroxy, $\beta$-chloro, $\beta$-bromo, $\beta$-methoxy, $\beta$-methylthio, $\beta$-methylsulphonyl or $\beta$-cyanoethyl groups or an ethylene, $\beta$-chloro- or $\beta$-bromo-ethylene radical. If B and $B_1$ stand for an aryl radical, this is preferably a phenyl radical which may be substituted by one or more halogen atoms, such as fluorine, chlorine or bromine, nitro groups, trifluoromethyl, hydroxy or lower alkoxy radicals, carboxyl or carboxamide groups, acylamino groups, sulphonamide or lower alkylsulphonyl radicals. Suitable heteroaryl radicals are, for example, the pyridyl, pyrrolyl, pyrimidinyl, furanyl, thienyl or sulpholanyl radicals. Examples of rings formed by B and $B_1$ and possibly interrupted by hetero atoms are the pyrrolidinyl, piperidinyl, morpholinyl, thiomorpholinyl or thiomorpholinyl dioxide rings.

Numerous dyestuffs containing carboxamide groups are known; they are prepared in the usual way by converting appropriate dyestuff intermediates which carry one or more carboxamide groups linked to the nucleus or in external position, into the desired final products while retaining the carboxamide groups and, if desired, carrying out further conversion reactions. Obviously, it is also possible to start from dyestuffs containing one or more carboxyl groups and to convert the carboxyl groups into the corresponding amides in the usual way via reactive intermediary stages, such as e.g. the esters or acid chlorides. In the case of azo dyestuffs, the usual conversion reactions are diazotisation and coupling as well as condensation; for most other dyestuff classes they are condensation reactions.

Examples of suitable azo dyestuffs containing carboxamide groups are the compounds given below where the radical

may have the following meaning:

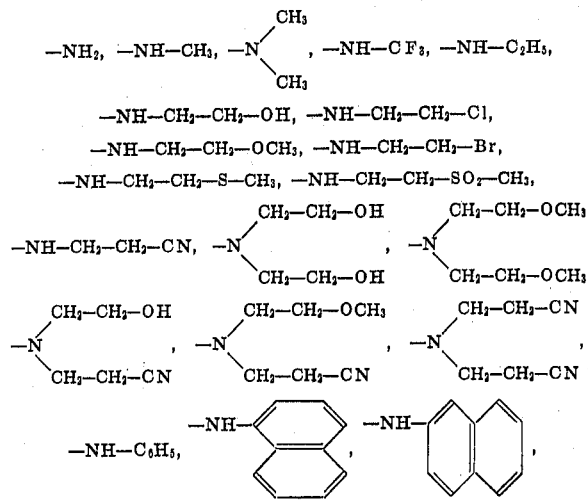

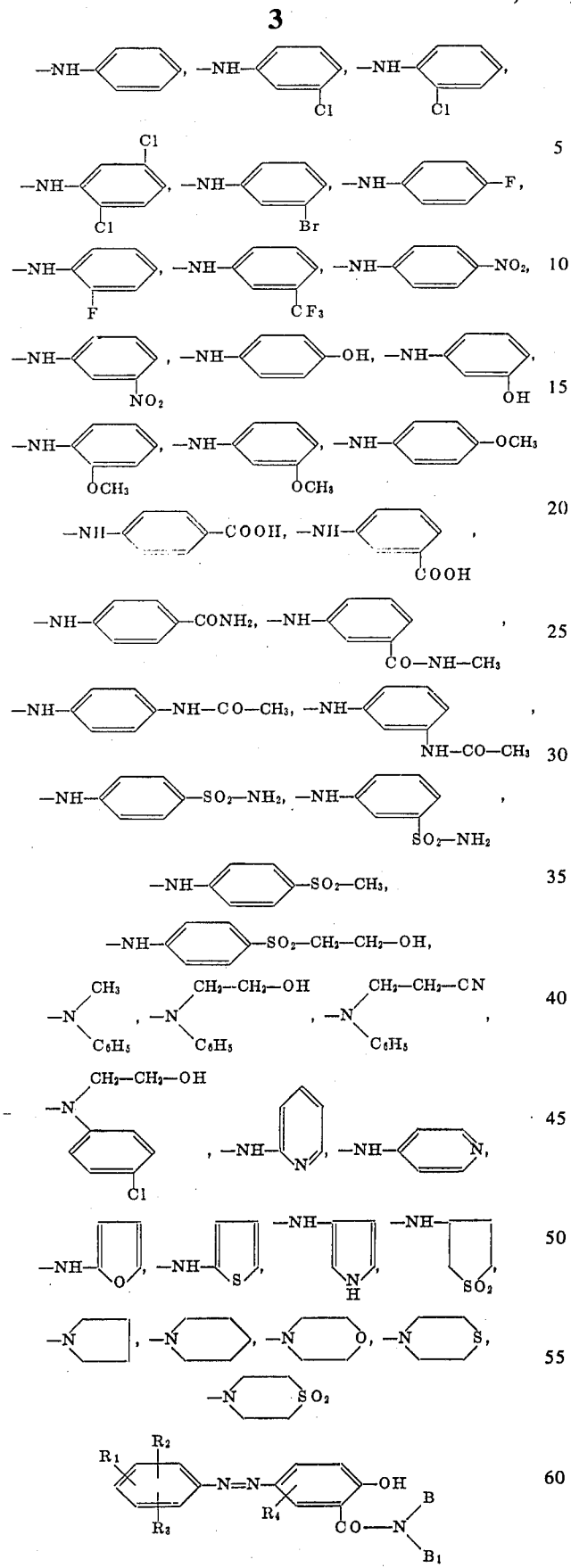
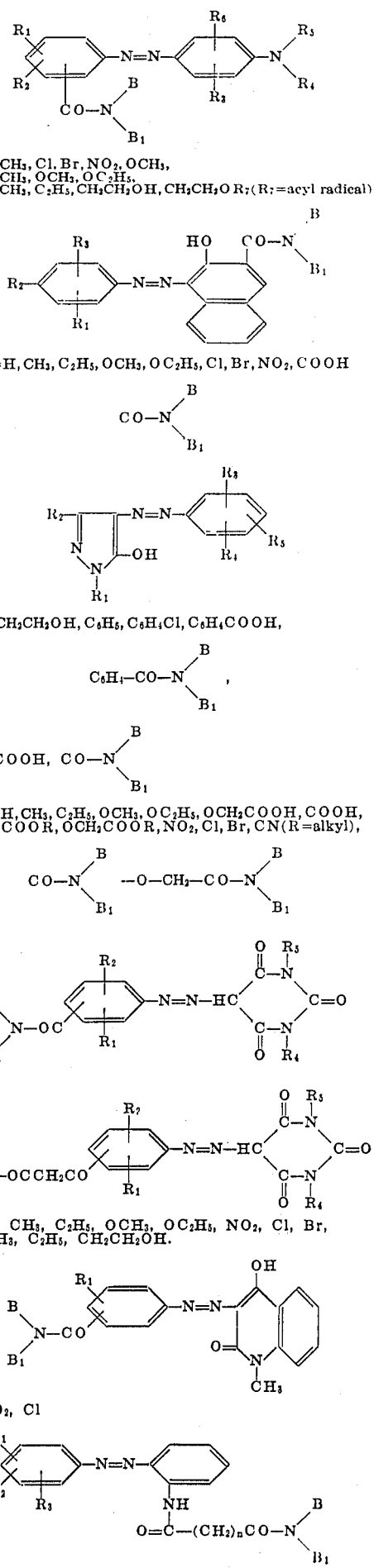

$R_1$, $R_2$, $R_3$=H, $CH_3$, $C_2H_5$, $OCH_3$, $OC_2H_5$, $OCH_2COOH$, $COOH$, $OCH_2COOR$, $COOR$, $NO_2$, $Cl$, $Br$, $CN$, $$O-CH_2-CO-N\begin{matrix}B\\B_1\end{matrix}, \quad CO-N\begin{matrix}B\\B_1\end{matrix},$$

$R_4$, $R_5$=$CH_3$, $C_2H_5$, $CH_2CH_2OH$, $CH_2CH_2OR$ (R=alkyl), n=0, 1, 2, 3.

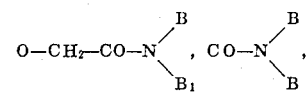

$R_1$, $R_2$=H, OH, $OCH_3$, Cl, $NO_2$, $CH_3$,
$R_3$, $R_4$=H, $CH_3$, $C_2H_5$, $OCH_3$, $OC_2H_5$, $R_5$=H, $CH_3$, $OCH_3$, $COOH$, $CO-N\begin{matrix}B\\B_1\end{matrix}$.

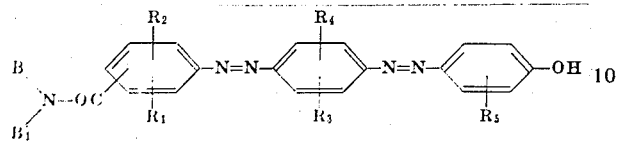

$R_1$, $R_2$, $R_3$=H, $CH_3$, $C_2H_5$, Cl, Br, $OCH_2COOH$, $OCH_2COOR$, $$COOH(R=alkyl), OCH_2CO-N\begin{matrix}B\\B_1\end{matrix}, CO-N\begin{matrix}B\\B_1\end{matrix},$$

$R_4$, $R_5$=H, $CH_3$, $C_2H_5$, $OCH_3$, $OC_2H_5$,
n=0, 1, 2.

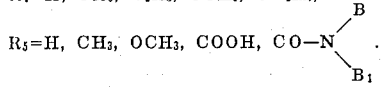

$R_1$, $R_2$, $R_3$=H, $CH_3$, $C_2H_5$, Cl, Br, $OCH_2COOH$, $OCH_2COOR$, $$COOH(R=alkyl), OCH_2CO-N\begin{matrix}B\\B_1\end{matrix}, CO-N\begin{matrix}B\\B_1\end{matrix},$$

$R_4$, $R_5$=H, $CH_3$, $C_2H_5$, $OCH_3$, $OC_2H_5$.

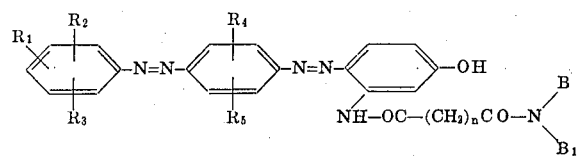

or

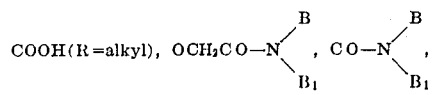

$R_1$, $R_2$=H, $CH_3$, $C_2H_5$, $OCH_3$, $OC_2H_5$, $NO_2$, Cl, Br,
$R_4$, $R_5$=$CH_3$, $C_2H_5$, $CH_2CH_2OH$.

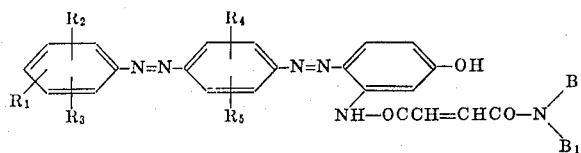

$R_1$=H, $NO_2$, Cl

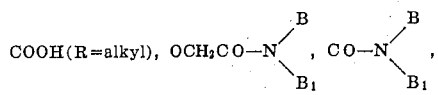

$R_1$, $R_2$, $R_3$=H, $CH_3$, $C_2H_5$, $OCH_3$, $OC_2H_5$, $OCH_2COOH$, $COOH$, $OCH_2COOR$, $COOR$, $NO_2$, Cl, Br, $CN$, $$O-CH_2-CO-N\begin{matrix}B\\B_1\end{matrix}, \quad CO-N\begin{matrix}B\\B_1\end{matrix},$$

$R_4$, $R_5$=$CH_3$, $C_2H_5$, $CH_2CH_2OH$, $CH_2CH_2OR$ (R=alkyl), n=0, 1, 2, 3.

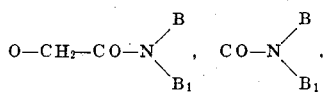

$R_1$, $R_2$=H, $CH_3$, Cl, Br, $NO_2$, $OCH_3$,
$R_3$, $R_4$=H, $CH_3$, $OCH_3$, $OC_2H_5$, $NHCO(CH_2)_nCOOH$, $NHCOCH=CHCOOH$, $$NHCO(CH_2)_nCO-N\begin{matrix}B\\B_1\end{matrix}, NHCOCH=CHCO-N\begin{matrix}B\\B_1\end{matrix},$$

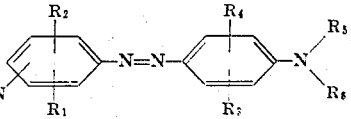

$R_5$, $R_6$=H, $CH_3$, $C_2H_5$, $CH_2CH_2OH$, $CH_2CH_2OR_7$ ($R_7$=acyl-radical), n=0, 1, 2, 3.

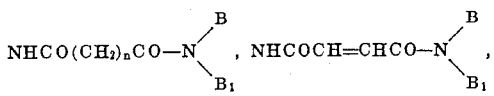

$R_1$, $R_2$, $R_3$, $R_4$, $R_5$=H, $CH_3$, $C_2H_5$, $OCH_3$.

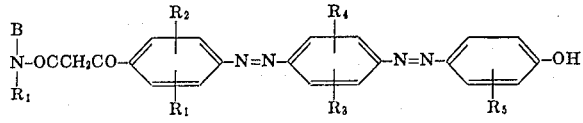

X=H, $CH_3$, n-$C_3H_7$, n-$C_4H_9$,
A=$-CH_2CH_2-$, $-CH_2CH_2-O-CH_2CH_2-$, $-CH_2CH_2-O-CO-CH_2CH_2-$, $-CH_2CH_2-O-CO-CH=CH-$,
$R_1$=$CH_3$, $C_2H_5$, sec. $C_4H_9$, $CH_2CH_2OH$, $CH_2CH_2OCOCH_3$, $CH_2CH_2CN$,
$R_2$=H, $C_1-C_4$-alkyl, $C_1-C_4$-alkoxy,
$R_3$=H, Hal, $C_1-C_4$-alkyl, $C_1-C_4$-alkoxy, $-NH-CO-R'$ ($R'$=$C_1-C_6$-alkyl).

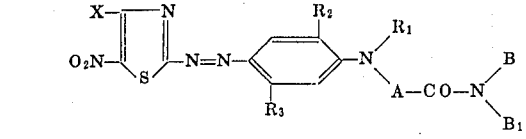

R=$CH_3$, $C_2H_5$, $C_4H_9$

Suitable anthraquinone dyestuffs are, for example, those in which one or more carboxamide groups stand in the anthraquinone molecule itself or in aryl or alkyl radicals which are linked to the anthraquinone molecule via bridge members such as amino, ether, thioether, sulphonamide or sulphonylamino groups. The anthraquinone compounds may have e.g. the following constitution where the group

can have the same meaning as above:

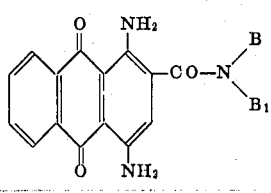

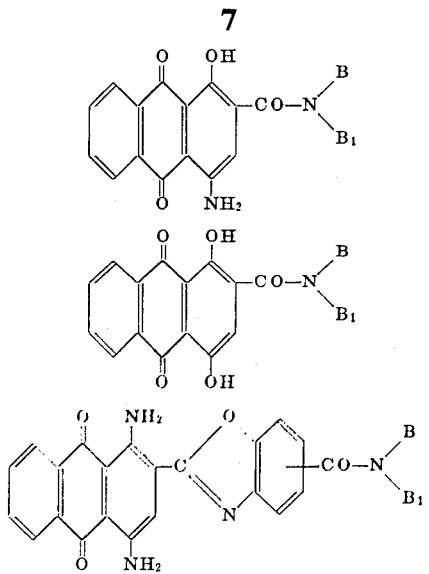
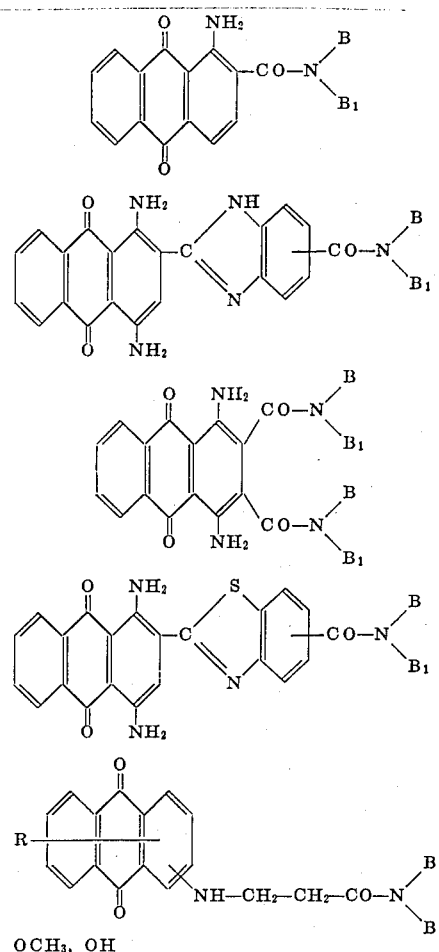
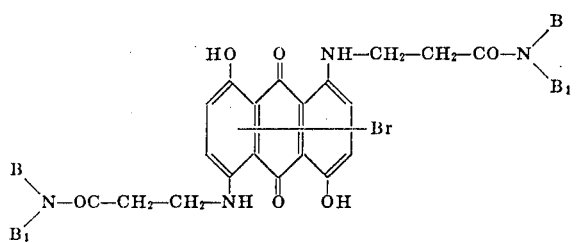
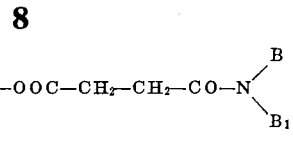
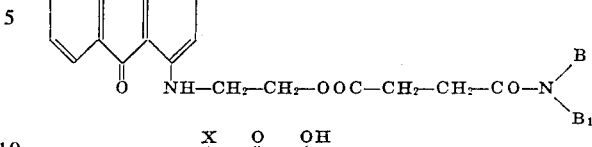
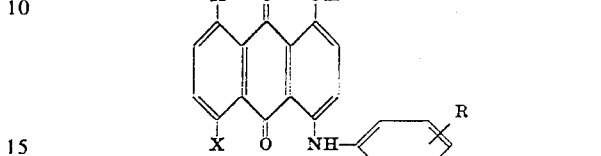
one X=OH, the other X=NO₂, NH₂,
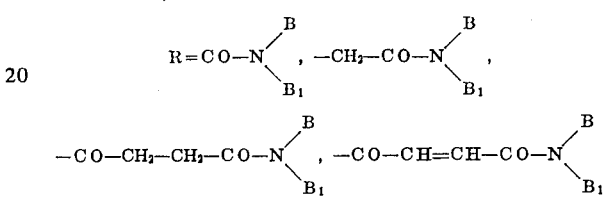
and also acylation products of aminoanthraquinones, e.g. of the formulae:
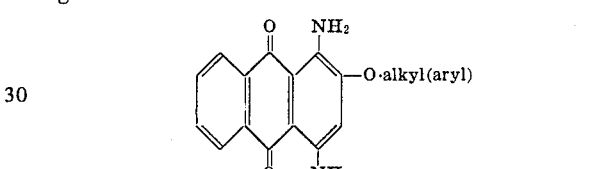
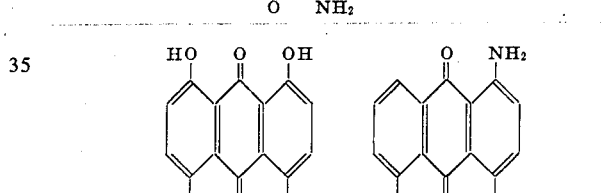
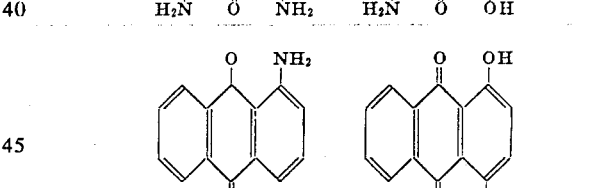
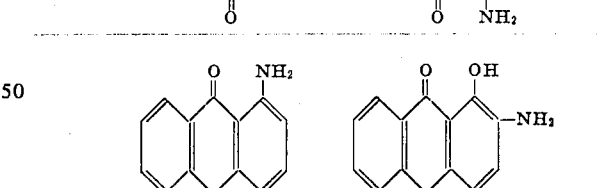
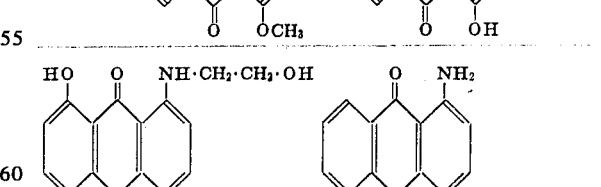
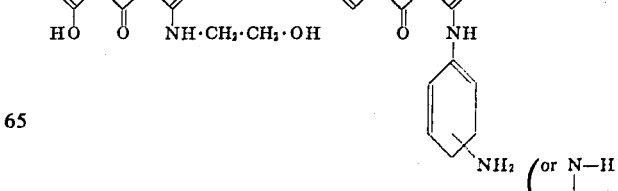

with dicarboxylic acids of the general formula:

$$HOOC-X-CO-N\begin{matrix}B\\B_1\end{matrix}$$

X = alkylene, arylene, bivalent heterocyclic radical or a compound of the formula $$ClO_2S-\underset{}{\bigcirc}-CO-N\begin{matrix}B\\B_1\end{matrix}$$

furthermore, the anthraquinone dyestuff assembled in the following table:

| Structure | (1) | (2) | (3) | (4) | (5) | (6) | (7) | (8) | (9) |
|---|---|---|---|---|---|---|---|---|---|
| 1,4-di-X-anthraquinone (O,X/O,X) | | | X | | | X | | | |
| 1-OH, 4-X / 8-X (O,OH/O,X) | | X | X | | X | X | | | |
| 1-NH₂, 4-X / 8-X (O,NH₂/O,X) | | X | X | | X | X | X | X | X |
| 1,5-diOH, 4,8-di-X (O,OH/O,OH) | X | X | X | X | | | | | |
| 1-OH, 4-X{2/3}, 5-NH₂ | X | X | ... | X | X | | | | |
| 1,5-diOH, 4,8-di-X (HO,O,OH / O₂N,O,X) (NH₂)(NH₂) | | X | X | | X | X | X | X | X |
| O₂N, O, OH / HO, O, X | | X | X | | X | X | X | X | X |

| Structure | (1) | (2) | (3) | (4) | (5) | (6) | (7) | (8) | (9) |
|---|---|---|---|---|---|---|---|---|---|
| 1,5-diOH-4,8-di(NH₂)-X{2/3} | | | X | | X | X | X | X | |
| 1,5-di(NH₂)-4-OH, 8-OH-X{2/3} | | | X | | X | X | X | X | |

1. $-O-C_2-C_6\text{-alkylene-}CO-N\begin{matrix}B\\B_1\end{matrix}$

2. $-S-C_2-C_6\text{-alkylene-}CO-N\begin{matrix}B\\B_1\end{matrix}$

3. $-NH-C_1-C_2\text{-alkylene-}CO-N\begin{matrix}B\\B_1\end{matrix}$

4. $-O-\underset{}{\bigcirc}-CO-N\begin{matrix}B\\B_1\end{matrix}$

5. $-S-\underset{}{\bigcirc}-CO-N\begin{matrix}B\\B_1\end{matrix}$

6. $-NH-\underset{}{\bigcirc}-CO-N\begin{matrix}B\\B_1\end{matrix}$

7. $-NH-\underset{}{\bigcirc}-O-C_1-C_2\text{-alkylene-}CO-N\begin{matrix}B\\B_1\end{matrix}$ 8. $-NH-\underset{}{\bigcirc}-C_1-C_2\text{-alkylene-}CO-N\begin{matrix}B\\B_1\end{matrix}$ 9. $-NH-\underset{}{\bigcirc}-S-C_1-C_2\text{-alkylene-}CO-N\begin{matrix}B\\B_1\end{matrix}$ Anthraquinone condensation products which contain carboxamide groups and carry more than three anellated rings are the following, for example: Isothiazole-anthrones, such as X = S-alkyl-COOH, NH-alkyl-CO-N⟨B/B₁⟩

S-aryl-COOH, NH-aryl-CO-N⟨B/B₁⟩

Pyrazole-anthrones, such as

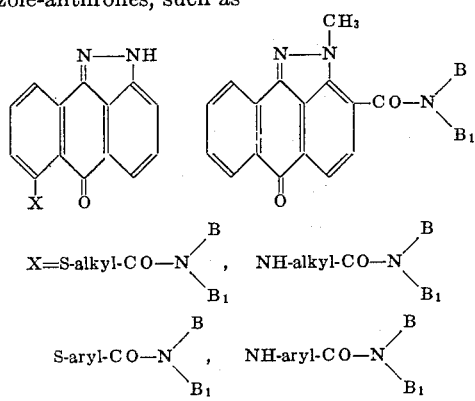

and also dyestuffs of the type

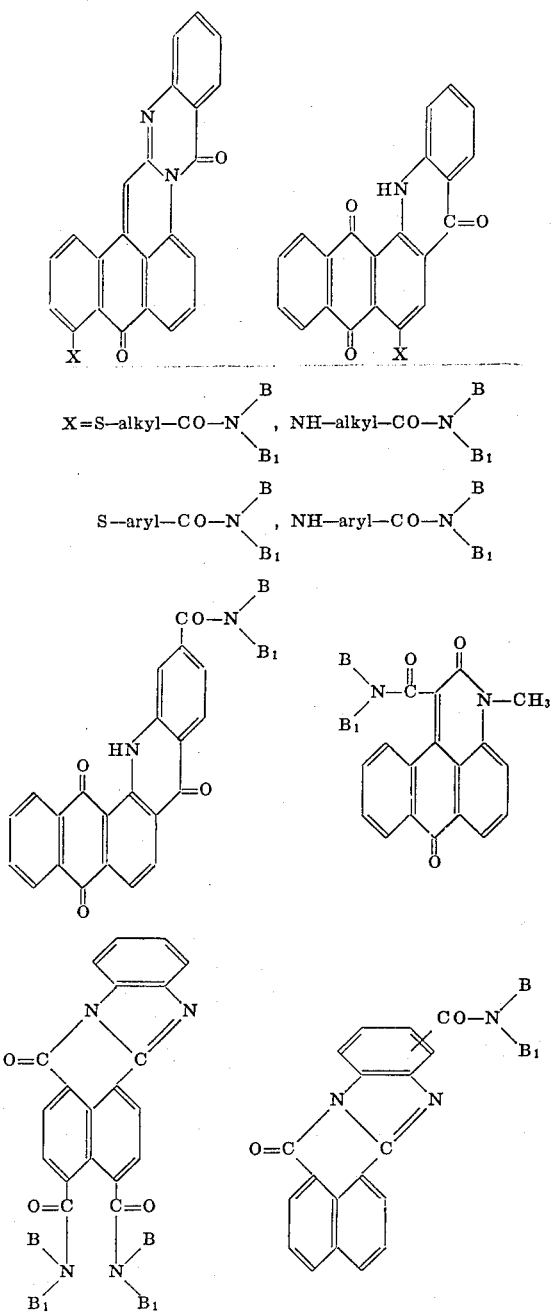

Anthraquinone dyestuffs of the above formulae are prepared according to the principles of synthesis known in anthraquinone chemistry. For this purpose, condensation reactions with suitable starting compounds are primarily suitable. For example, amino group-containing anthraquinone compounds in which the amino groups stand either in an external position or, preferably, in a position linked to the nucleus, can be condensed with suitable carboxyaryl-acid halides or anhydrides, e.g. carboxyphenyl- or carboxynaphthyl-sulphonic acid or carboxylic acid chlorides or bromides, to form the corresponding acid amides; or anthraquinone compounds containing mobile halogen atoms, for example, can be reacted with carboxyarylamines, such as carboxyphenyl- or carboxynaphthylamines, to form the corresponding carboxyarylamino-anthraquinone derivatives, and the free carboxyl groups still present in the resultant dyestuffs can be converted in known manner into carboxamide groups. Alternatively, anthraquinone compounds containing amino groups, for example, can be condensed with carboxamidoaryl acid halides or anhydrides or e.g. anthraquinone compounds with mobile halogen atoms can be condensed with carboxamido-arylamines.

Anthraquinone ether and thioether derivatives in which carboxamide groups are contained in alkyl, aralkyl or aryl radicals of the ether or thioether component can be prepared according to similar principles of synthesis. Another possibility of synthetising carboxamide group-containing anthraquinone dyestuffs to be used according to the invention consists in that anthraquinone-acid halides, such as carboxylic acid and sulphonic acid chlorides or bromides, are converted into the corresponding amides or esters with the aid of suitable amino or hydroxy compounds which also contain at least one carboxamide group. Of course, it is also possible to use those anthraquinone compounds for the present process, in which one or more carboxamide groups are linked to the nucleus or which contain carboxamide groups linked to the nucleus as well as in an external position.

Representatives of nitro dyestuffs containing carboxamide groups are, for example, dyestuffs of the following formula:

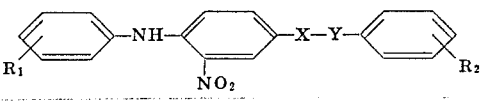

X = —SO₂— or —CO—

Y = —NH— or —O—

R₁, R₂ = H, Cl, Br, F, CH₃, C₂H₅, CH₃O, C₂H₅O, OH, CN, NO₂, CF₃, COOH, O—CH₂—COOH, —O—CH₂—CH₂—COOH,

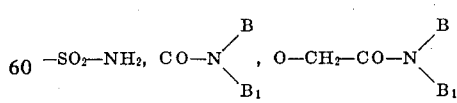

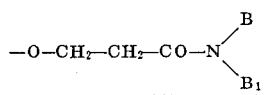

It has frequently proved advantageous for the dyebaths to contain small amounts, i.e., up to 1 per cent by weight, preferably 0.5 per cent by weight, of water, referred to the weight of the organic solvents.

Furthermore, the addition of non-ionic auxiliaries to the dyebaths has proved useful in some cases. Suitable non-ionic auxiliaries are primarily the known interface-active ethoxylation and propoxylation products of fatty alcohols, alkylphenols, fatty acid amides and fatty acids, as well as mixtures thereof; the auxiliaries are used in an amount of 0.05–2 per cent by weight, referred to the weight of the organic solvents. Instead of immediately adding the auxiliaries to the dyebaths, they can advantageously be used for pasting the dyestuffs containing carboxamide groups and thus be added to the dyebaths in the form of a dyestuff/auxiliary paste.

The synthetic fibre materials to be dyed according to the invention are primarily fibre materials of polyesters, such as polyethylene terephthalate, polycyclohexane-dimethylene teraphthalate; heterogeneous polyesters obtained from terephthalic acid, sulphoisophthalic acid and ethylene glycol; or copolyether ester fibres obtained from p-hydroxy-benzoic acid, terephthalic acid and ethylene glycol; cellulose triacetate, cellulose 2½-acetate, polyacrylo-nitrile, synthetic polyamides such as hexamethylene-diamine adipate, poly-$\epsilon$-caprolactam, or $\omega$-amino-undecanic acid and polyurethanes. The fibre materials may be present in various stages of processing, e.g. as filaments, flocks, combed material, yarn, or as piece goods such as fabrics or knitted fabrics or as ready-made goods.

Dyeing according to the invention is preferably carried out in closed apparatus, for example, by introducing the fibre materials in a goods to liquor ratio of 1:3 to 1:30 into the dispersions of the disperse dyestuffs in the organic water-immiscible solvents at room temperature, heating the dyebath to 60°–170° C and maintaining this temperature until the bath is exhausted; in general, this will be the case after 10–60 minutes. After cooling to room temperature, the liquor is removed and, possibly after briefly rinsing with fresh organic solvent, the fibre materials are freed from the adhering solvent by filtering off with suction or centrifuging and subsequent drying in a warm current of air. With the aid of the process according to the invention it is possible to dye synthetic fibre materials from organic solvents in a simple way, high dyestuff yields and excellent fastness properties being achieved.

The dyestuffs are applied in an amount of 0,01 to 3 percent by weight referred to the weight of the fibre materials.

The carboxamide group-containing dyestuffs to be used according to the invention are largely insoluble in organic water-immiscible solvents. They are superior to the dyestuffs hitherto used for dyeing synthetic fibre materials from organic solvents on account of a substantially higher affinity and an increased fastness to sublimation. Another advantage of the process according to the invention consists in that the depth of colour of the resultant dyeings at a given ratio dyestuff: dyeing material is substantially independent of the concentration of the dyestuff in the dye-bath and therefore also independent of the liquor ratio. Due to this independence of the liquor ratio, the process according to the invention can be used in all known dyeing devices, such as winches, jiggers, etc. which, as is known, are operated with different liquor ratios, and it yields reproducible dyeings.

It should be pointed out that mixtures of the dyestuffs to be used according to the invention sometimes give a better dyestuff yield than the individual dyestuffs.

The parts given in the following Examples are parts by weight.

EXAMPLE 1

100 Parts of a fabric of textured polyethylene terephthalate fibres are introduced at room temperature, without previous cleaning, into a dyebath prepared from 1 part of the monoazo dyestuff 4-aminobenzoic acid ethyl ester → 1-phenyl-5-pyrazolone-3-carboxylic acid amide and 1,000 parts tetrachloroethylene.

The bath is heated to 115° C within 10 minutes with vivid circulation of the liquid, and the same temperature is maintained for 30 minutes. The liquor is then separated and the dyed material is rinsed with fresh solvent at about 40° C for 5 minutes. After separating the rinsing liquor, the dyed material is centrifuged and dried in an air current. A strong yellow dyeing of excellent fastness to sublimation and very good fastness to washing and light is obtained.

An equally good yellow dyeing was obtained in the same way on a fabric of polycyclohexane-dimethylene terephthalate fibres.

Yellow dyeings of equally good fastness properties were obtained when the dyestuff mentioned above was replaced with the same amount of one of the following monoazo dyestuffs:

| Example | Dyestuff |
|---|---|
| 2 | 4-amino-benzoic acid-methylamide → 1-phenyl-5-pyrazolone-3-carboxylic acid methylamide |
| 3 | 4-amino-benzoic acid → 1-phenyl-5-pyrazolone-3-carboxylic acid amide |
| 4 | 4-amino-benzoic acid methyl ester → 1-($\beta$-cyano-ethyl)-5-pyrazolone-3-carboxylic acid-bis-($\beta$-hydroxyethyl)-amide |
| 5 | 3-amino-benzoic acid-amide → (1-(3-sulpholanyl-3-methyl-5-pyrazolone |
| 6 | 4-nitro-2-chloro-aniline → 1-($\beta$-carbonylamido-ethyl)-3-methyl-5-pyrazolone |
| 7 | 4-amino-3-nitro-benzoic acid methyl ester → 1-($\beta$-phenylamino-carbonyloxy-ethyl)-5-pyrazolone-3-carboxylic acid amide |
| 8 | 4-amino-benzoic acid ethyl amide → 1-(phenyl-3-carboxamido)-3-methyl-5-pyrazolone |
| 9 | 4-amino-benzoic acid methyl ester → 1-(phenyl-4-carboxamido)-5-pyrazolone-3-methyl ester |
| 10 | 4-amino-benzoic acid amide → 1-(phenyl-3-carboxethylamido)-5-pyrazolone-3-carboxylic acid ethyl amide |

EXAMPLE 11

100 Parts of a fabric of triacetate fibres are introduced at room temperature into a dyebath prepared from 1 part of the monoazo dyestuff 4-aminobenzoic acid-methyl ester → 1-phenyl-5-pyrazolone-3-carboxylic acid piperidide and 1,000 parts tetrachloroethylene.

The bath is heated to 110° C within 20 minutes with vivid circulation of the liquor, and the same temperature is maintained for 45 minutes. The liquor is then separated and the fabric rinsed with fresh trichloroethylene at 40° C. After separating the rinsing liquor, the dyed material is freed from the adhering solvent by centrifuging and drying in an air current. A full, brilliant yellow dyeing of excellent fastness properties is obtained.

EXAMPLE 12

100 Parts of yarn of acetate filaments are introduced at about 22° C into a dyebath prepared from
- 1 part of the monoazo dyestuff 4-aminobenzoic acid pyrrolidide → 1-phenyl-5-pyrazolone-3-carboxylic acid methylamide
- 1,000 parts tetrachloroethylene
- 1.5 parts oleic acid ethanolamide
- 1.5 parts oleyl alcohol eicosaethylene glycol ether and
- 6 parts of water.

The bath is heated to 78° C within 20 minutes, and the same temperature is maintained for 45 minutes. After separating the dyeing liquor and rinsing with fresh tetrachloroethylene, the dyed material is freed from the adhering solvent by filtering off with suction and drying in an air current. A brilliant yellow dyeing is obtained.

EXAMPLE 13

100 Parts of polyacrylonitrile fibres are dyed in a bath prepared as described in Example 3. The bath is heated to 100° C within 20 minutes, and the same temperature is maintained for 30 minutes. After the usual washing and drying, a yellow dyeing of good fastness properties is obtained.

EXAMPLE 14

100 Parts of a fabric of polyethylene terephthalate fibres are heated in a dyebath containing
- 1 part of the monoazo dyestuff 3-aminobenzoic acid amide 1-methyl-2,4-dihydroxy-quinoline in
- 1,000 parts tetrachloroethylene to 115° C within 10 minutes, and dyed at the said temperature for 30 minutes. After separating the liquor, rinsing and drying, there is obtained a brilliant greenish yellow dyeing of very good fastness to sublimation, washing and light.

Dyestuffs of equally good fastness properties in the shades indicated in the following Table were obtained when the above dyestuff was replaced with the same amount of one of the dyestuffs mentioned in the Table:

| Example | Diazo component | Coupling component | Shade |
|---|---|---|---|
| 15 | 2-amino-t-nitro-benzoic acid amide | 1-methyl-2,4-dihydroxyquinoline | greenish yellow |
| 16 | 4-amino-benzoic acid β-cyanoethyl-amide | " | " |
| 17 | 3-amino-benzoic acid-anilide | " | " |
| 18 | 3-amino-benzoic acid-bis-(β-cyanoethyl)-amide | " | " |
| 19 | 3-amino-benzoic acid-β-cyanoethyl-β-hydroxyethyl amide | " | " |
| 20 | 3-amino-benzoic acid (3-chloroanilide) | " | " |
| 21 | 3-amino-benzoic acid (4-methoxyanilide) | " | " |
| 22 | 4-amino-3-nitro-benzoic acid-phenyl-methylamide | " | " |
| 23 | 4-amino-3-nitro-benzoic acid-pyridide | " | " |
| 24 | 3-amino-4-nitro-benzoic acid-(3-sulpholanylamide) | " | " |
| 25 | 2-amino-3,5-dinitro-benzoic acid-β-methoxyethyl-amide | 3-methyl-N,N-dihydroxyethyl-aniline | reddish blue |
| 26 | 3-amino-4-chloro-benzoic acid-(1-naphthylamide) | 3-methyl-N,N-dihydroxyethyl-aniline | reddish orange |
| 27 | 3-nitro-aniline | N,N-bis-(methylaminocarbonylmethyl)- | reddish yellow |
| 28 | 2-chloro-4-nitro-aniline | N,N-dihydroxyethyl-aniline-bis-(maleic acid amide semiester | red |
| 29 | 5-amino-1,2,4-triazole-3-carboxylic acid amide | N,N-bis-(β-cyano-ethyl)-aniline | yellow |
| 30 | 2-cyano-4-nitro-aniline | 2-ethoxy-5-acetamino-N,N-bis-(methylaminocarbonylethyl)-aniline | navy blue |
| 31 | 2,4-dinitro-6-bromo-aniline | 2-ethoxy-5-acetamino-N,N-bis-(dimethyl-aminocarbonylethyl)-aniline | greenish blue |
| 32 | 2-cyano-4-nitro-aniline | N,N-bis-(β-amino carbonylethyl)-aniline | red- |
| 33 | 2,4-dinitro-aniline | N,N-bis-(β-methyl-aminocarbonylethyl)-aniline | red-brown |
| 34 | 2-amino-4-nitro-benzoic acid-(2,5-dichloro-anilide) | 3-acetylamino-N,N-diethylaniline | violet |
| 35 | 2-cyano-4-nitro-aniline | 4-methoxy-3-(N,N-bis-β-hydroxyethylamino)-anilido-glutaric acid ethylamide | blue |
| 36 | 2-cyano-4-nitro-aniline | N,N-bis-(β-hydroxyethyl-glutaric acid semiester amide) | bluish red |

| Example | Diazo component | Coupling component | Shade |
|---|---|---|---|
| 37 | 2-chloro-4-nitro-aniline | 3-methyl-aniline-N,N-bis-(3,3-propionic acid amide) | red |
| 38 | 2,6-dichloro-4-nitro-aniline | Aniline-N,N-bis-(3,3-propionic acid amide) | brown-orange |
| 39 | 2-chloro-5-trifluoro-methyl-aniline | Aniline-N,N-bis-(3,3-propionic acid morpholide) | orange |
| 40 | 2,5-dichloro-aniline | 3-methyl-aniline-N,N-bis-(3,3-propionic acid amide) | red |
| 41 | 2-chloro-4-nitro-aniline | N-ethyl-aniline-N-(3-propionic acid-3'-carboxyanilide) | red |
| 42 | 4-nitro-2-amino-venzoic acid amide | N-($\beta$-cyanoethyl)-aniline-N-(3-propionic acid) | red |
| 43 | 2-amino-4-nitro-phenoxy acetic acid bis-($\beta$-hydroxy-ethyl)-amide | N-($\beta$-hydroxyethyl)-N-($\beta$-cyanoethyl)-aniline | red |
| 44 | 2-chloro-4-nitro-aniline | Aniline-N-(3-propionic acid-3'-ethoxyanilide) | red |
| 45 | 2-cyano-4-nitro-aniline | Aniline-N-($\beta$-hydroxy-ethyl-phthalic acid semiester amide) | violet |
| 46 | 2-chloro-4-nitro-aniline | N-methyl-aniline-N-($\beta$-hydroxyethyl-glutaric acid semi-ester amide) | red |
| 47 | 2-chloro-4-nitro-aniline | N-methyl-aniline-N-($\beta$-hydroxyethyl-succinic acid semiester-methyl-amide) | red |
| 48 | 2-cyano-4-nitro-aniline | 2-ethoxy-5-acetylamino-N,N-bis-($\beta$-hydroxy-ethyl-glutaric acid semiester amide) | blue |
| 49 | 2,4-dinitro-6-bromo-aniline | 2-ethoxy-5-acetylamino-N,N-bis-($\beta$-hydroxy-ethyl-glutaric acid semiester amide) | blue |
| 50 | 3-phenyl-5-amino-thiadiazole-(1,2,4) | 3-N,N-dimethylamino-anilido-glutaric acid methylamide | red-brown |

EXAMPLE 51

100 Parts of a knitted fabric of polyethylene terephthalate fibres are dyed in a dyebath containing
1 part of the disazo dyestuff 3-aminobenzoic acid methylamide → 1-amino-2,5-dimethoxybenzene→ salicylic acid amide in
2,000 parts tetrachloroethylene
at 115° C for 30 minutes. After the usual rinsing and drying, a brown dyeing of very good fastness to sublimation, washing and light is obtained.

Dyeings of equally good fastness properties were obtained when the above dyestuff was replaced with the same amount of one of the following disazo dyestuffs:

| Example | Dyestuff | Shade |
|---|---|---|
| 52 | 4-amino-benzoic acid amide → aniline → salicylic acid | reddish yellow |
| 53 | 3-amino-salicylic acid amid → aniline → N,N-($\beta$-hydroxyethyl)-aniline | red-brown |
| 54 | 4-amino-benzoic acid anilide → aniline →phenol | reddish yellow |
| 55 | 4-amino-benzoic acid-(4-cyano-anilide) → aniline → 4-tert.-butylphenol | reddish yellow |
| 56 | 4-amino-phenoxy acetic acid amide → aniline → salicylic acid amide | orange |
| 57 | 4-ethoxycarbonylamino-aniline → aniline → salicylic acid amide | orange |

EXAMPLE 58

50 Parts of a fabric of polyester fibres are introduced at room temperature into a dyebath prepared from
0.5 parts 4-(3-aminocarbonyl-phenylamino)-5-nitro-1,8-dihydroxy-anthraquinone
0.5 parts 4-(3-aminocarbonyl-phenylamino)-8-nitro-1,5-dihydroxy-anthraquinone
1.5 parts oleic acid ethanolamide
1.5 parts oleyl alcohol eicosaethylene glycol ether
6 parts of water and
500 parts tetrachloroethylene.

The bath is heated to 120° C within 10 minutes with vivid circulation of the liquor, and the same temperature is maintained for 45 minutes. After separating the dyeing liquor, the dyed material is rinsed with fresh solvent at 40° C, the rinsing liquor is removed and the material dried in an air current. A deep blue dyeing of excellent fastness to light and sublimation is obtained.

Equally satisfactory blue dyeings are obtained when the 500 parts tetrachloroethylene are replaced with the same amount of 1,1,2-trichloroethane, 1,1,1,2-tetrachloroethane, 1,1,2,2-tetrachloroethane, pentachloroethane, 1,2-dichloropropane, 2-chlorobutane, 1,4-dichlorobutane, perfluoro-n-hexane, 1,2,2-trifluoro-trichloroethane, trifluoro-penta-chloropropane, chlorobenzene, fluorobenzene, chlorotoluene or benzotrifluoride.

EXAMPLE 59

100 Parts of fibre yarn of poly-ε-caprolactam are introduced at room temperature into a dyebath containing 1 part of the dyestuff mixture mentioned in Example 58 in
1,000 parts tetrachloroethylene.

The bath is heated to 100° C within 20 minutes with vivid circulation of the liquor, and the same temperature is maintained for 40 minutes. After this period of time, the liquor is separated, the material briefly rinsed with fresh solvent and, after centrifuging, the dyeing is dried in an air current. A brilliant blue dyeing of good fastness properties is obtained.

An equally good dyeing was obtained on yarns of polyhexamethylene-diamine adipate fibres.

The strength of colour of the dyeing can be increased by ~ 10 percent by adding 1 part oleyl ethanolamide
1 part oleyl alcohol eicosaethylene glycol ether and
4 parts of water to the dyebath.

EXAMPLE 60

100 Parts of a polyethylene terephthalate fabric are dyed at 115° C for 30 minutes in a dyebath consisting of 1 part 4-(3-aminocarbonyl-phenylamino)-8-amino-1,5-dihydroxy-anthraquinone,
3 parts oleic acid ethanolamide
3 parts oleyl alcohol eicosaethylene glycol ether
12 parts of water and
1,600 parts tetrachloroethylene.

After rinsing with fresh tetrachloroethylene and drying, there is obtained a strong blue dyeing of very good fastness to sublimation, washing and light.

Dyeings of equally good fastness properties in the shades indicated in the following Table were obtained when the above dyestuff was replaced with the same amount of one of the dyestuffs mentioned in the Table:

| Example | Dyestuff | Shade |
|---|---|---|
| 61 | 4-(3-methylaminocarbonyl-phenylamino)-5-amino-1,5-dihydroxy-anthraquinone | blue |
| 62 | 1,4-diamino-anthraquinone-2-carboxylic acid-(bis-β-hydroxyethyl)-amide | blue |
| 63 | 1-amino-4-hydroxy-anthraquinone-2-carboxylic acid-β-methoxyethylamide | bluish red |
| 64 | 1-amino-anthraquinone-2-carboxylic acid anilide | orange |
| 65 | 1,4-diamino-anthraquinone-2,3-dicarboxylic acid diamide | reddish blue |
| 66 | 2-(3-thiomorpholinylcarbonyl-benzoxazolyl-(2))-1,4-diamino-anthraquinone | blue |
| 67 | 1-(2-(β-cyanoethylaminocarbonyl)-ethyl-amino)-4-hydroxy-anthraquinone | bluish red |
| 68 | 1-(β-(4-hydroxyphenylaminocarbonyl)-acryloylamino)-anthraquinone | yellow |
| 69 | 1,4-bis-(β-methylaminocarbonylethyl-amino)-anthraquinone | blue |
| 70 | 1-amino-2-(3-aminocarbonylphenoxy)-4-hydroxy-anthraquinone | bluish red |
| 71 | 1-amino-2-(4-aminocarbonylphenoxy)-4-hydroxy-6-chloro-anthraquinone | bluish red |
| 72 | 1-amino-2-(4-(β-aminocarbonylethoxy)-β-phenoxyethoxy)-4-hydroxy-anthraquinone | yellowish red |
| 73 | 1-amino-2-(β-bis-(β-hydroxyethyl)-amino-carbonyl)-ethoxy)-4-hydroxy-anthraquinone | yellowish red |
| 74 | 1-amino-2-((β-cyanoethyl-β-hydroxy-ethyl)-aminocarbonylmethylthio)-4-hydroxy-anthraquinone | red |
| 75 | 1-hydroxy-4-(3-aminocarbonylphenyl-amino)-anthraquinone | reddish blue |
| 76 | 1-amino-4-(3-aminocarbonylphenyl-amino)-anthraquinone | blue |
| 77 | 1-amino-4-(4-aminocarbonylphenylthio)-anthraquinone | red |
| 78 | 1,5-diamino-2-(3-methylaminocarbonyl-4-hydroxy-phenyl)-4,8-dihydroxy-anthraquinone | greenish blue |
| 79 | 1,5-diamino-3-(3-methylaminocarbonyl-4-hydroxy-phenyl)-4,8-dihydroxy-anthraquinone | blue |
| 80 | 1,5-dihydroxy-4-(β-methylamino-carbonylethylamino)-8-nitro-anthraquinone | reddish blue |
| 81 | 1,5-dihydroxy-4-(β-aminocarbonyl-ethylamino)-8-amino-anthraquinone | blue |
| 82 | 1,8-dihydroxy-4-(β-aminocarbonyl-ethylamino)-5-amino-anthraquinone | blue |
| 83 | 1,5-dihydroxy-4,8-di-(β-methylamino-carbonylethylamino)-anthraquinone | greenish blue |
| 84 | 1,8-dihydroxy-4,5-di-(β-aminocarbonyl-ethylamino)-anthraquinone | greenish blue |
| 85 | 1,4,5,8-tetra-(β-ethylaminocarbonyl-ethylamino)-anthraquinone | blue-green |
| 86 | 1,5-diamino-2- or -3-(aminocarbonyl)-methylthio)-4,8-dihydroxy-anthraquinone | blue |
| 87 | 1-amino-2-(aminocarbonylmethoxy-methyl-1,4-cyclohexylmethoxy)-4-hydroxy-anthraquinone | yellowish red |
| 88 | 1-amino-2-(γ-(β-hydroxyethylamino-carbonylmethoxy)-propoxy)-4-hydroxy-anthraquinone | yellowish red |
| 89 | 1,4-dihydroxy-2-(4-β-hydroxyethyl-aminocarbonylphenylthio)-anthraquinone | scarlet |
| 90 | 1,4-dihydroxy-2-(β-aminocarbonylethyl-thio)-anthraquinone | scarlet |
| 91 | 1-amino-2-(β-aminocarbonylethylthio)-4-cyclohexylamino-anthraquinone | blue |
| 92 | 1,9-isothiazole-anthrone-2-carboxylic acid (3-carboxyanilide) | yellow |
| 93 | 1,9-isothiazole-anthrone-2-carboxylic acid (4-acetylaminoanilide) | yellow |
| 94 | 5-(2-(bis-β-hydroxyethylaminocar-bonyl)-ethylamino)-1,9-isothiazole-anthrone | yellow |
| 95 | 5-(2-aminocarbonylethylthio)-1,9-isothiazole-anthrone | yellow |
| 96 | 5-(2-aminocarbonylethylamino)-1,9-pyrazole-anthrone | greenish yellow |
| 97 | 4-(3-aminocarbonylphenylamino)-N-methyl-1,9-anthrapyridone | red |
| 98 | 2-(2-diethylaminocarbonylethylamino)-3,4-phthaloylacridone | blue |
| 99 | Naphthoylenbenzimidazole-Bz-3-carboxylic acid amide | yellow |
| 100 | Naphthoylenbenzimidazole-1,8-di-(carboxylic acid-methylamide) | yellow |
| 101 | 1,4-diamino-anthraquinone-2-sulphonic acid-(4-aminocarbonyl-phenylester) | blue |
| 102 | 1-amino-2-(β-aminocarbonyl-methoxy-ethoxy)-4-hydroxy-anthraquinone | yellowish red |
| 103 | 1,8-dihydroxy-4-(3-methylamino-carbonyl-methoxyphenylamino)-8-nitro-anthraquinone | greenish blue |
| 104 | 1,4,5-tri-(β-ethylaminocarbonyl-ethyl-amino)-8-hydroxy-anthraquinone | greenish blue |
| 105 | 1-amino-2-(4-β-hydroxyethylamino-carbonyl-phenoxy)-4-methylsulphonyl-amino-anthraquinone | bluish red |
| 106 | 1-amino-2-(β-methoxyethoxy)-4-(3-aminocarbonyl-phenylsulphonyl-amino)-anthraquinone | bluish red |
| 107 | 1,5-dihydroxy-2- or -3-bromo-4,8-di-(β-aminocarbonylethylamino)-anthraquinone | blue |
| 108 | 1,8-dihydroxy-2- or -3-bromo-4,5-di-(β-aminocarbonylethylamino)-anthraquinone | blue |
| 109 | 1,5,8-trihydroxy-4-(3-aminocarbonyl-phenylamino)-anthraquinone | blue red |
| 110 | 1-oxo-2-(β-aminocarbonylethyl)-3-imino-4,7-diamino-5,6-phthaloyl-isoindoline | turquoise |

EXAMPLE 111

100 Parts polyethylene terephthalate filaments are heated in a dyebath consisting of 1 part 4-phenylamino-3-nitrobenzene-sulphonic acid-(4-aminocarbonyl-phenylamide)
3 parts oleic acid ethanolamide
3 parts oleyl alcohol eicosaethylene glycol ether
12 parts of water and
1,600 parts tetrachloroethylene at 115° C for 30 minutes with vivid circulation of the liquor, then centrifuged and rinsed with tetrachloroethylene at 40° C for 5 minutes. A strong greenish yellow dyeing of very good fastness to sublimation, washing and light is obtained.

An equally satisfactory dyeing is obtained when the tetrachloroethylene is replaced with the same amount of 1,1,2-trichloroethane.

Similar dyeings are also obtained when fibres of anion-modified polyethylene terephthalate (Dacron 64) or anion-modified polyhexamethylene-diamine adipate (Nylon T 844) are dyed, instead of polyethylene terephthalate fibres.

Dyeing of equally satisfactory fastness properties in the shades indicated in the following Table were obtained when the above dyestuff was replaced with the same amount of one of the dyestuffs mentioned in the Table:

| Example | Dyestuff | Shade |
|---|---|---|
| 112 | 4-(4-aminocarbonylphenylamino)-3-nitro-benzene-sulphonic acid anilide | yellow |
| 113 | 4-(4-aminocarbonylphenylamino)-3-nitro-benzo-sulphonic acid-(4-aminocarbonyl-phenylamide) | yellow |
| 114 | 4-(2,5-dichlorophenylamino)-3-nitro-benzene-sulphonic acid-3-(bis-(β-hydroxyethyl)-aminocarbonylphenylamide) | greenish yellow |
| 115 | 4-(3-methoxyphenylamino)-3-nitro-benzene-sulphonic acid-(2-aminocarbonylphenyl-amide) | reddish yellow |
| 116 | 4-(3-carboxyphenylamino)-3-nitro-benzene-sulphonic acid-(4-methylaminocarbonyl-phenylamide) | yellow |
| 117 | 4-(3-fluorophenylamino)-3-nitro-benzene- acid-(4-aminocarbonyl-3-hydroxy-phenylamide) | greenish yellow |
| 118 | 4-(4-cyanophenylamino)-3-nitro-benzene-sulphonic acid-(4-aminocarbonylphenyl-amide) | yellow |
| 119 | 4-(3-cyanophenylamino)-3-nitro-benzene sulphonic acid-(4-β-cyanoethylamino-carbonylphenylamide) | yellow |
| 120 | 4-(2-nitrophenylamino)-3-nitro-benzene-sulphonic acid-(4-aminocarbonyl-methoxy-phenylamide) | yellow |
| 121 | 4-(4-methylphenylamino)-3-nitro-benzene-sulphonic acid-(4-aminocarbonylphenyl-amide) | yellow yellow |
| 122 | 4-(3-trifluoromethylphenylamino)-3-nitro-benzene-sulphonic acid-(4-β-aminocarbonyl-ethoxyphenylamide) | greenish yellow |
| 123 | 4-(3-aminocarbonylphenylamino)-3-nitro-benzene-sulphonic acid-(4-amino-sulphonyl-phenylamide) | yellow |
| 124 | 4-(4-carboxymethoxyphenylamino)-3-nitro-benzene-sulphonic acid-(4-aminocarbonyl-phenylamide) | reddish yellow |
| 125 | 4-(4-β-carboxyethoxyphenylamino)-3-nitro-benzene-sulphonic acid-(3-aminocarbonyl-phenylamide) | reddish yellow |
| 126 | 4-phenylamino-3-nitro-benzene-sulphonic acid-(4-aminocarbonyl-phenylester) | yellow yellow |
| 127 | 4-(4-aminocarbonylphenylamino)-3-nitro-benzene-sulphonic acid-(4-aminocarbonyl-phenylester) | yellow |
| 128 | 4-(4-aminocarbonylphenylamino)-3-nitro-benzene-sulphonic acid-(4-bis-(β-hydroxy-ethyl)-aminocarbonyl-phenylester) | yellow |

-Continued

| Example | Dyestuff | Shade |
|---|---|---|
| 129 | 4-phenylamino-3-nitro-benzoic acid-(4-aminocarbonyl-phenylamide) | reddish yellow |
| 130 | 4-(4-aminocarbonyl-phenylamino)-3-nitro-benzoic acid-(4-aminocarbonyl-phenyl-amide) | reddish yellow |
| 131 | 4-(4-aminocarbonyl-phenylamino)-3-nitro-benzoic acid-phenylamide | reddish yellow |
| 132 | 4-(4-methylphenylamino)-3-nitro-benzoic acid-(3-bis-(β-hydroxyethyl)-amino-phenylamide) | reddish yellow |
| 133 | 4-(3-ethoxyphenylamino)-3-nitro-benzoic acid phenylamide | reddish yellow |
| 134 | 4-(2-cyanophenylamino)-3-nitro-benzoic acid-(3-morpholinylcarbonyl-phenylamide) | reddish yellow |
| 135 | 4-pheylamino-3-nitro-benzoic acid-(3,5-bis-(aminocarbonyl)-phenylamide) | reddish yellow |
| 136 | 4-(4-nitrophenylamino)-3-nitro-benzoic acid-(3-methylaminocarbonyl-4-hydroxy-phenylamide) | reddish yellow |
| 137 | 4-(3,4-dichlorophenylamino)-3-nitro-benzoic acid-(4-β-cyanoethylamino-carbonylphenylamide) | yellow |
| 138 | 4-(3-methylaminocarbonyl-phenylamino)-3-nitro-benzoic acid-(4-aminocarbonyl-phenylamide). | reddish yellow |
| 139 | 4-phenylamino-3-nitro-benzoic acid (4-aminocarbonyl-phenylester). | yellow |
| 140 | 4-(4-aminocarbonyl-phenylamino)-3-nitro-benzoic acid phenylester | yellow |
| 141 | 4-(4-aminocarbonyl-phenylamino)-3-nitro-benzoic acid-(4-aminocarbonyl-phenyl-ester) | yellow |
| 142 | 4-(4-aminocarbonyl-phenylamino)-3-nitro-benzoic acid amide | yellow |
| 143 | 4-phenylamino-3-nitro-benzoic acid-bis-(β-hydroxyethyl)-amide | yellow |
| 144 | 4-(2-nitrophenylamino)-3-nitro-benzoic acid-bis-(β-cyanoethyl)-amide | yellow |
| 145 | 4-(2-methylsulphonyl-4-nitro-phenylamino)-3-nitro-benzoic acid amide | yellow |
| 146 | 4-(4-nitro-2-cyano-phenylamino)-benzoic acid amide | yellow |
| 147 | 4-(4-carboyxphenylamino)-3-nitro-benzoic acid amide | yellow |
| 148 | 4-(4-aminocarbonyl-phenylamino)-3-nitro-benzoic acid amide | yellow |
| 149 | 4-(4-aminocarbonylphenylamino)-3-nitro-benzoic acid-bis-(β-hydroxyethyl)-amide | yellow |
| 150 | 4-(4-aminocarbonylphenylamino)-3-nitro-benzenesulphonic acid-bis-(β-hydroxy-ethyl)-amide | yellow |
| 151 | 4-(4-aminocarbonyl-phenylamino)-3-nitro-benzene sulphonic acid amide | yellow |

EXAMPLE 152

100 Parts of yarn of polyethylene terephthalate fibre are dyed in a dyebath consisting of
1 part of the quinophthalone dyestuff of the formula

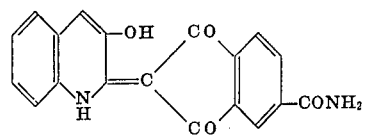

2.5 parts oleic acid ethanolamide
2.5 parts oleyl alcohol
10 parts of water and
1,600 parts tetrachloroethylene as described in Example 111. A clear yellow dyeing is obtained, which is characterised by good fastness to sublimation, washing and light.

An equally satisfactory dyeing is obtained when the above quinophthalone-carboxamide dyestuff is replaced with a bromination product which contains about 1 atom bromine per molecule and is obtained in known manner by bromination in nitrobenzene or glacial acetic acid.

Clear yellow dyeings are also obtained when the dyestuff mentioned in Example 152 is replaced with equal amounts of the quinophthalone-carboxylic acid amides indicated in the following Table:

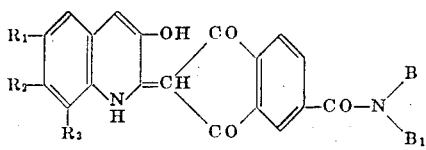

| Example | $R_1$ | $R_2$ | $R_3$ | $\begin{array}{c}B\\N\\B_1\end{array}$ |
|---|---|---|---|---|
| 153 | H | H | H | $NH-CH_3$ |
| 154 | H | H | H | $N(CH_3)_2$ |
| 155 | H | H | H | $NH-C_2H_5$ |
| 156 | H | H | H | $NH-CH_2-CH_2-OH$ |
| 157 | H | H | H | $N(CH_2-CH_2-OH)_2$ |
| 158 | H | H | H | $NH-CH_2-CH_2-CN$ |
| 159 | Cl | H | H | $\begin{array}{c}N\quad O\end{array}$ |
| 160 | Br | H | H | $NH_2$ |
| 161 | Cl | Cl | H | $NH-CH_3$ |
| 162 | $NO_2$ | H | H | $NH_2$ |
| 163 | $CH_3O$ | H | H | $NH-CH_2-CH_2-OH$ |
| 164 | $CH_3-CO-NH$ | H | H | $N(CH_3)_2$ |
| 165 | H | H | $CH_3$ | $NH_2$ |
| 166 | H | H | $CH_3O$ | $NH_2$ |

Greenish yellow dyeings are obtained when the quino-phthalone-carboxamide dyestuff mentioned in Example 152 is replaced with equal parts of one of the methine dyestuffs of the formulae

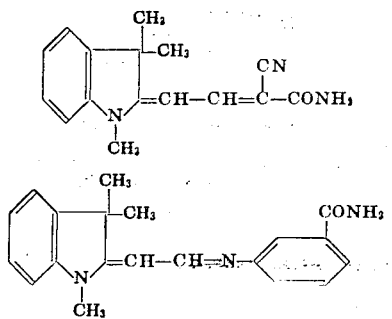

or one of the styryl dyestuffs of the formulae

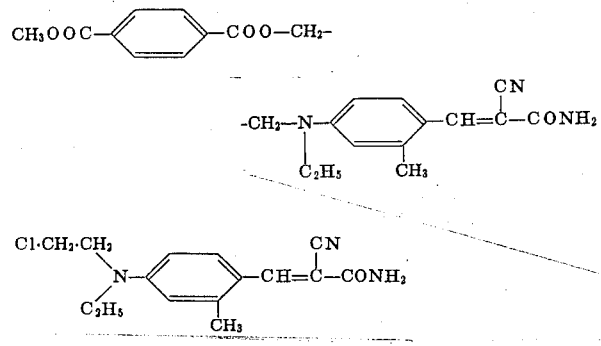

We claim:
1. Process for dyeing synthetic fiber material by exhaustion comprising introducing synthetic fiber material into a dyebath which is a dispersion consisting essentially of
   A. organic solvent; and
   B. disperse dyestuff containing 1 to 4 carboxamide groups and largely insoluble in said dyebath; said organic solvent consisting of tetrachloro-ethylene, trichloroethylene, 1,1,1-trichloro-ethane, 1,1,1-trichloropropane or mixtures thereof; and dyeing at a temperature of 60° to 170° C for 10–60 minutes until the dyebath is exhausted.
2. The process of claim 1 in which said organic solvent consists of tetrachloroethylene.
3. Process according to claim 1, wherein said carboxamide group-containing disperse dyestuff is a monoazo dyestuff of the formula

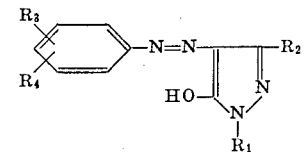

in which
   $R_1$ stands for a $C_1$-$C_4$-alkyl radical which may be substituted by a cyano or carboxamide group, an aryl radical which may be substituted by a carboxamide group or a sulpholanyl radical;
   $R_2$ denotes a $C_1$-$C_4$-alkyl, $C_1$-$C_4$-carbalkoxy or a carboxamide group;
   $R_3$ denotes a halogen atom, a carboxyl, $C_1$-$C_4$carbalkoxy or a carboxamide group; and
   $R_4$ means a hydrogen atom or a nitro group, with the proviso that at least one of the radicals $R_1$, $R_2$ or $R_3$ is a carboxamide group or a radical containing a carboxamide group.
4. Process according to claim 1, wherein said monoazo dyestuffs of the formula

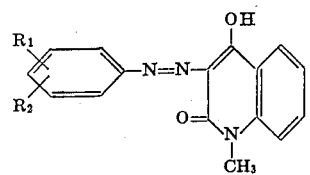

in which
   $R_1$ denotes a carboxamide group and
   $R_2$ means a hydrogen atom or a nitro group.
5. Process according to claim 1 wherein said carboxamide group-containing disperse dyestuff is a monoazo dyestuff of the formula

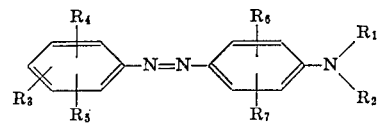

in which
   $R_1$ and $R_2$, independently of one another, stand for a $C_1$-$C_4$-alkyl group or for the groupings -CH₂CH₂OH, -CH₂CH₂CN, -CH₂-CONR₈R₉,
-CH₂CH₂-O-CO-CH₂CH₂-CONR₈R₉,
-CH₂-CH₂-O-CO-CH₂-CH₂-CONR₈R₉,
-CH₂-CH₂-O-CO-CH₂-CH₂-CH₂-CONR₈R₉,
-CH₂-CH₂-O-CO-CH=CH-CONR₈R₉,

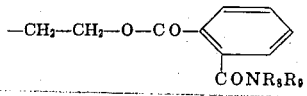

in which R₈ and R₉, independently of one another, denote hydrogen or a C₁-C₄-alkyl group or the grouping -CH₂-CH₂-CONR'R''
in which R' means hydrogen, a C₁-C₄alkyl or an optionally substituted aryl radical, and R'' means hydrogen or a C₁-C₄-alkyl radical;

R₄ means hydrogen, a halogen atom, a nitro, cyano or carboxamido-methyl-oxy group;

R₅ denotes hydrogen, a halogen atom or a nitro group;

R₆ is hydrogen, a C₁-C₄-alkyl or C₁-C₄-alkoxy group; and

R₇ means hydrogen, an acetylamino or γ-carbamoyl-butyrylamino group, with the proviso that at least one of the radicals R₁, R₂, R₃, R₄ or R₇ is a carboxamide group or a radical containing a carboxamide group.

6. Process according to claim 1 wherein said carboxamide group-containing disperse dyestuff is a disazo dyestuff of the formula

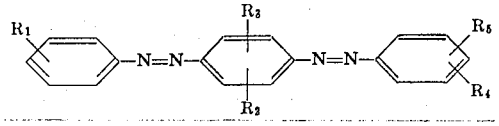

in which
R₁ denotes hdyrogen or an amino, carboxamide or carboxamidomethyl-oxy group;
R₂ and R₃, independently of one another, stand for hdyrogen or a C₁-C₄-alkoxy group;
R₄ denotes hydrogen, a C₁-C₄-alkyl, a carboxyl or carboxamide group; and
R₅ denotes a hydroxy group,
with the proviso that at least one of the radicals R₁ or R₄ is a carboxamide group or a radical containing a carboxamide group.

7. Process acccording to claim 1 wherein said carboxamide group-containing disperse dyestuff is a nitro dyestuff of the formula

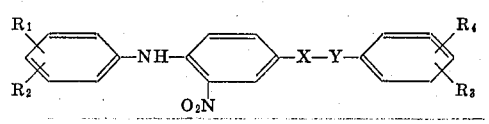

in which
X stands for a group -SO₂- or -CO-
Y is -NH- or -O-
R₁ means hydrogen, a halogen atom, a cyano, nitro, C₁-C₄-alkyl, trifluoromethyl, carboxyl, carboxymethyl-oxy, 2-carboxyethyl-oxy, C₁-C₄-alkoxy or a carboxamide group;
R₂ is hydrogen or a halogen atom;
R₃ is hydrogen, a carboxamide, carboxamidomethyl-oxy, 2-carboxamidoethyl-oxy- or sulphonamide group; and
R₄ denotes hdyrogen, a hydroxy or carboxamide group, with the proviso that at least one of the radicals R₁, R₃ or R₄ is a carboxamide group or a radical containing a carboxamide group.

8. Process according to claim 1 wherein said carboxamide group-containing disperse dyestuff is a nitro dyestuff of the formula

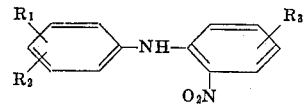

in which
R₁ means hydrogen, a nitro, carboxyl or carboxamide group;
R₂ stands for hydrogen or a methylsulphonyl group; and
R₃ denotes a carboxyl, carboxamide or sulphonamide group,
with the proviso that at least one of the radicals R₁ and R₃ is a carboxamide group.

9. Process according to claim 1 wherein said anthraquinone dyestuffs of the formula

[A—(X-Y-D)ₙ in which
A denotes an anthraquinone radical which may be substituted by halogen atoms, hydroxy, nitro, amino and/or cycloalkylamino groups;
D is a carboxamide group;
X denotes a single C-C bond or a grouping -NH-, -O-, -S-, -SO₂-, or -SO₃-;
Y means a single C-C bond, an arylene, C₁-C₄-alkylene, C₁-C₄-alkylene-oxy-methylene, C₁-C₄-alkylene-oxy-carbonyl-alkylene, C₁-C₄-carbonyl-alkylene, C₁-C₄-carbonyl-alkenylene or arylene-oxy-methylene radical; and
n is a number from 1 to 4.

10. Process according to claim 1 wherein said carboxamide group-containing disperse dyestuff is a anthraquinone dyestuff of the formula

[A—(NH-Y-D)ₙ in which
A denotes an anthraquinone radical which may be substituted by halogen atoms, hydroxy, nitro and/or amino groups;
D is a carboxamide group;
Y means a C₁-C₄-alkylene, C₁-C₄-alkylene-oxy-carbonyl-alkylene, C₁-C₄-carbonyl-alkylene or C₁-C₄-carbonyl-alkenylene group; and
n is a number from 1 to 4.

11. Process according to claim 1 wherein said carboxamide group-containing disperse dyestuff is a anthraquinone dyestuff of the formula

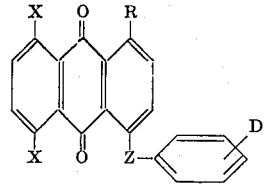

in which
D is a carboxamide group;
R means a hydroxy or amino group;
Z stands for -NH- or -S-; and
X means hydrogen or one X means a hydroxy group and the other X means a hydroxy, nitro, or amino group.

12. Process according to claim 1 wherein said carboxamide group-containing disperse dyestuff is a anthraquinone dyestuff of the formula

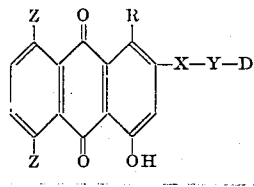

in which
D is a carboxamide group;
R denotes a hydroxy or amino group;
X stands for -O-, -S-, -SO$_2$- or -SO$_3$-;
Y means a C$_1$-C$_4$-alkylene, C$_1$-C$_4$-alkylene-oxymethylene radical, the groupings

or

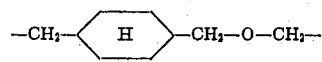

or a phenylene radical; and
Z means hydrogen or one Z means a hydroxy group and the other Z means an amino group.

13. Process according to claim 1 wherein said carboxamide group-containing disperse dyestuff is a anthraquinone dyestuff of the formula

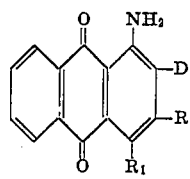

in which
D means a carboxamide group;
R is hydrogen or a carboxamide group; and
R$_1$ is hydrogen, a hydroxy or amino group.

14. Process according to claim 1 wherein said carboxamide group-containing disperse dyestuff is a anthraquinone dyestuff of the formula

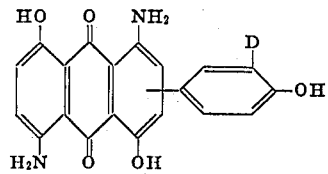

in which

D stands for a carboxamide group.

15. Process according to claim 1 wherein said carboxamide group-containing disperse dyestuff is a 1,9-isothiazole-anthrone dyestuff of the formula

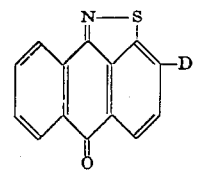

in which
D is a carboxamide group.

16. Process according to claim 1 wherein said carboxamide group-containing disperse dyestuff is a dyestuff of the formula

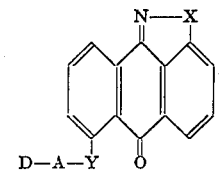

in which
X and Y, independently of one another, stand for -S- or -NH-;
A denotes a C$_1$-C$_4$-alkylene radical, and
D means a carboxamide group.

17. Process according to claim 1 wherein said carboxamide group-containing dyestuff is a N-methyl-anthrapyridone dyestuff of the formula

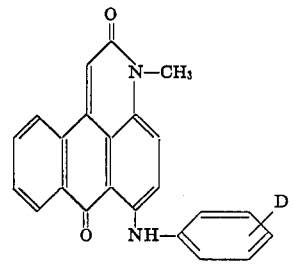

in which
D stands for a carboxamide group.

18. Process according to claim 1 wherein said carboxamide group-containing disperse dyestuff is a phthaloylacridone dyestuff of the formula

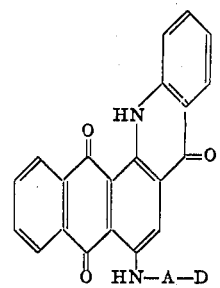

in which
A denotes a C$_1$-C$_4$-alkylene radical; and

D means a carboxamide group.

19. Process according to claim 1 wherein said disperse dyestuff is a naphthoylene-benzimidazole dyestuff of the formula

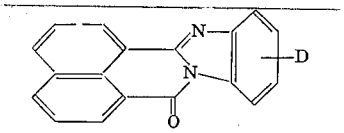

in which

D denotes a carboxamide group.

20. Process according to claim 1 wherein said carboxamide group-containing disperse dyestuff is a naphthoylene-benzimidazole dyestuff of the formula

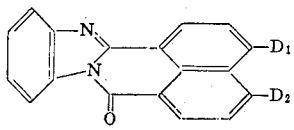

in which $D_1$ and $D_2$ denote carboxamide groups.

21. Process according to claim 1 wherein said carboxamide group-containing disperse dyestuff, quinophthalone dyestuff of the formula

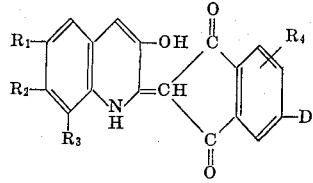

in which

D denotes a carboxamide group;

$R_1$ means hydrogen, a halogen atom, a nitro, $C_1$-$C_4$-alkoxy or an acetylamino group;

$R_2$ is hydrogen, or a halogen atom; and $R_4$ denotes hydrogen or a halogen atom.

22. The process of claim 1 wherein said synthetic fiber material is polyester, polyamide, cellulose 2½ acetate, cellulose triacetate, polyacrylonitrile or polyurethane.

23. The process of claim 1 wherein said synthetic fiber material is polyester.

24. The process of claim 1 wherein said dyestuff is an azo dyestuff.

25. The process of claim 1 wherein said dyebath contains up to 1 percent by weight of water based on the weight of the aliphatic halogenated hydrocarbon.

26. The process of claim 1 wherein said dyebath contains 0.05 to 2 percent by weight of non-ionic dyeing auxiliary based on the weight of said aliphatic halogenated hydrocarbon.

* * * * *

UNITED STATES PATENT OFFICE
CERTIFICATE OF CORRECTION

PATENT NO. : 3,792,971
DATED : February 19, 1974
INVENTOR(S) : Rutger Neeff and Dietmar Kalz It is certified that error appears in the above-identified patent and that said Letters Patent are hereby corrected as shown below:

| COLUMN | LINE | ERROR |
|---|---|---|
| 3 | 1st formula | "⟩," should read --- ⟩-Cl, --- |
| 4 | last formula | "⟩" should read --- ⟩-N(R$_4$)(R$_5$) --- |
| 5 | 5 | "CO-N(B)(B)," should read --- CO-N(B)(B$_1$), --- |
| 5 | line 43 to the end | Delete this portion. |
| 6 | top of page through line 7 | Delete this portion. |
| 6 | 26 | "B–N(R$_1$)–" should read --- B–N(B$_1$) --- |

Page 2

UNITED STATES PATENT OFFICE
CERTIFICATE OF CORRECTION

PATENT NO. : 3,792,971
DATED : February 19, 1974
INVENTOR(S) : Rutger Neeff and Dietmar Kalz It is certified that error appears in the above-identified patent and that said Letters Patent are hereby corrected as shown below:

| COLUMN | LINE | ERROR |
|---|---|---|
| 6 | 40 in the formula | " $\begin{array}{c} B \\ B_1 \end{array} N-OC-N \begin{array}{c} H \\ N \\ \| \\ N \end{array}$ " should read --- $\begin{array}{c} B \\ B_1 \end{array} N-OC \begin{array}{c} N-H \\ \| \\ N \end{array}$ --- |
| 15 | Ex. 15 | "2-amino-t-nitro-" should read --- 2-amino-5-nitro- --- |
| 16 | Ex. 35 | "anilido-gluraric acid" should read --- anilido-glutaric acid --- |
| 17 | Ex. 42 | "Venzoic acid amide" should read --- benzoic acid amide --- |
| 22 | Ex. 147 | "4-(4-carboyxphenylamino)" should read --- 4-(4-carboxyphenylamino) --- |

UNITED STATES PATENT OFFICE
CERTIFICATE OF CORRECTION

PATENT NO. : 3,792,971
DATED : February 19, 1974
INVENTOR(S) : Rutger Neeff and Dietmar Kalz It is certified that error appears in the above-identified patent and that said Letters Patent are hereby corrected as shown below:

| COLUMN | LINE | ERROR |
|---|---|---|
| 24 | 39 & 40 | Delete these two lines and insert --- Process according to Claim 1 wherein said carboxamide group-containing disperse dyestuff is a monoazo dyestuff of the formula --- |
| 25 | 44 | "hdyrogen" should read --- hydrogen --- |
| 25 | 47 | "hdyrogen" should read --- hydrogen --- |
| 26 | 28 & 29 | Delete "anthraquinone dyestuffs of the formula" and insert --- carboxamide group-containing disperse dyestuff is an anthraquinone dyestuff of the formula --- |
| 29 | 2 | After the word "said" insert --- carboxamide group-containing --- |
| 29 | 32 | After the word "dyestuff" remove the comma (,) and insert --- is a --- |
| 30 | 16 | After line 16 insert --- $R_3$ means hydrogen, a $C_1$-$C_4$-alkyl, a $C_1$-$C_4$-alkoxy group; --- |

Signed and Sealed this sixteenth Day of December 1975

[SEAL]

Attest:

RUTH C. MASON
*Attesting Officer*

C. MARSHALL DANN
*Commissioner of Patents and Trademarks*